United States Patent
Guzik et al.

(10) Patent No.: US 12,405,933 B2
(45) Date of Patent: Sep. 2, 2025

(54) CONTENT MANAGEMENT SYSTEM FOR TRAINED MACHINE LEARNING MODELS

(71) Applicants: Getac Technology Corporation, Taipei (TW); WHP Workflow Solutions, Inc., North Charleston, SC (US)

(72) Inventors: Thomas Guzik, Edina, MN (US); Muhammad Adeel, Edina, MN (US); Ryan Kucera, Columbia Heights, MN (US)

(73) Assignees: Getac Technology Corporation, Taipei (TW); WHP Workflow Solutions, Inc., North Charleston, SC (US)

( * ) Notice: Subject to any disclaimer, the term of this patent is extended or adjusted under 35 U.S.C. 154(b) by 1149 days.

(21) Appl. No.: 17/107,763

(22) Filed: Nov. 30, 2020

(65) Prior Publication Data
US 2022/0171750 A1 Jun. 2, 2022

(51) Int. Cl.
G06F 16/21 (2019.01)
G06N 5/04 (2023.01)
G06N 20/00 (2019.01)

(52) U.S. Cl.
CPC ............. *G06F 16/219* (2019.01); *G06N 5/04* (2013.01); *G06N 20/00* (2019.01)

(58) Field of Classification Search
CPC ......... G06F 16/219; G06N 20/00; G06N 5/04
See application file for complete search history.

(56) References Cited

U.S. PATENT DOCUMENTS 6,760,744 B1 7/2004 Halaas et al.
7,917,888 B2 3/2011 Chong et al.
(Continued)

FOREIGN PATENT DOCUMENTS

CN 109671266 B 11/2020
JP 2008204219 A 9/2008
(Continued)

OTHER PUBLICATIONS

Li et al. "Exploration of classification confidence in ensemble learning" Sep. 2014 https://www.sciencedirect.com/science/article/pii/S0031320314001198 (Year: 2014).

(Continued)

*Primary Examiner* — George Giroux
(74) *Attorney, Agent, or Firm* — Finnegan, Henderson, Farabow, Garrett & Dunner, L.L.P.

(57) ABSTRACT

A content management system (CMS) manages content for trained machine learning (ML) models. The CMS may develop first, second, and third trained ML models from corresponding datasets, to output respective values of dependent variables derived from data underlying the datasets as independent variables, the respective outputs having statistical confidences in the accuracy of their predictions. The third dataset results from combining the first and second datasets, and the third trained ML model is derived from training on the third dataset. The datasets and ML models are stored in a data store, with the trained ML models associated with respective datasets, the datasets with respective underlying data, the trained ML models with respective statistical confidences and corresponding thresholds, and the trained ML models with metadata indicating independent and dependent variables. The datasets and ML models can be versioned and the provenance of the datasets tracked for future ML modeling.

19 Claims, 5 Drawing Sheets

(56) References Cited

U.S. PATENT DOCUMENTS

| | | | |
|---|---|---|---|
| 8,452,722 B2 | 5/2013 | Naeve et al. | |
| 8,606,844 B2 | 12/2013 | Kaufman et al. | |
| 8,688,320 B2 | 4/2014 | Faenger | |
| 9,110,774 B1 | 8/2015 | Bonn et al. | |
| 9,264,678 B2 | 2/2016 | Nuyttens et al. | |
| 9,449,229 B1 | 9/2016 | Laska et al. | |
| 9,483,732 B1 | 11/2016 | Milakovich | |
| 9,485,474 B2 | 11/2016 | Kim et al. | |
| 9,681,104 B2 | 6/2017 | Billau et al. | |
| 9,723,251 B2 | 8/2017 | Slotky | |
| 9,738,125 B1 | 8/2017 | Brickley et al. | |
| 9,755,890 B2 | 9/2017 | Robertson et al. | |
| 9,832,205 B2 | 11/2017 | Santhi et al. | |
| 9,848,312 B2 | 12/2017 | Sundel et al. | |
| 9,852,132 B2 | 12/2017 | Chhichhia et al. | |
| 9,886,261 B1 | 2/2018 | Hotchkies | |
| 10,324,773 B2 | 6/2019 | Wing et al. | |
| 10,460,014 B2 | 10/2019 | Lloyd et al. | |
| 10,540,883 B1 | 1/2020 | Keil et al. | |
| 10,902,955 B1 | 1/2021 | Federoff et al. | |
| 10,929,361 B2* | 2/2021 | Gerweck | G06F 16/215 |
| 11,132,750 B2* | 9/2021 | Malone | G16H 10/20 |
| 11,238,290 B2 | 2/2022 | Burns et al. | |
| 11,301,746 B2* | 4/2022 | Lin | G06F 18/217 |
| 11,605,288 B2 | 3/2023 | Guzik | |
| 2003/0081127 A1 | 5/2003 | Kirmuss | |
| 2003/0095688 A1 | 5/2003 | Kirmuss | |
| 2003/0163512 A1 | 8/2003 | Mikamo | |
| 2003/0208679 A1 | 11/2003 | Vazquez | |
| 2006/0257001 A1 | 11/2006 | Veen et al. | |
| 2008/0147267 A1 | 6/2008 | Plante et al. | |
| 2008/0303903 A1 | 12/2008 | Bentley et al. | |
| 2009/0150017 A1 | 6/2009 | Caminiti et al. | |
| 2009/0210455 A1 | 8/2009 | Sarkar et al. | |
| 2009/0248711 A1 | 10/2009 | Martinez et al. | |
| 2009/0284359 A1 | 11/2009 | Huang et al. | |
| 2010/0036560 A1 | 2/2010 | Wright et al. | |
| 2010/0144318 A1 | 6/2010 | Cable | |
| 2010/0145734 A1* | 6/2010 | Becerra | G06Q 40/08 705/4 |
| 2010/0268536 A1* | 10/2010 | Suendermann | G10L 15/22 704/E15.008 |
| 2011/0205068 A1 | 8/2011 | Huynh et al. | |
| 2011/0302151 A1 | 12/2011 | Abadi et al. | |
| 2012/0084747 A1 | 4/2012 | Chakradhar et al. | |
| 2013/0039542 A1 | 2/2013 | Guzik | |
| 2013/0344856 A1 | 12/2013 | Silver et al. | |
| 2013/0347005 A1 | 12/2013 | Lam et al. | |
| 2014/0236875 A1* | 8/2014 | Phillipps | G06Q 30/0202 706/12 |
| 2014/0343796 A1 | 11/2014 | Abuelsaad et al. | |
| 2015/0089019 A1 | 3/2015 | Chou | |
| 2015/0341370 A1 | 11/2015 | Khan | |
| 2016/0042767 A1 | 2/2016 | Araya et al. | |
| 2016/0086397 A1 | 3/2016 | Phillips | |
| 2016/0153801 A1 | 6/2016 | Cho et al. | |
| 2016/0190859 A1 | 6/2016 | Blum et al. | |
| 2016/0248856 A1 | 8/2016 | Kao | |
| 2016/0342447 A1 | 11/2016 | Richter et al. | |
| 2016/0358098 A1* | 12/2016 | Duesterwald | G06N 20/00 |
| 2016/0371553 A1 | 12/2016 | Farnham, IV et al. | |
| 2016/0378607 A1 | 12/2016 | Kumar et al. | |
| 2017/0011324 A1 | 1/2017 | Truong et al. | |
| 2017/0048482 A1 | 2/2017 | Drako et al. | |
| 2017/0063912 A1* | 3/2017 | Muddu | H04L 43/045 |
| 2017/0124487 A1* | 5/2017 | Szeto | G06F 11/1448 |
| 2017/0148027 A1 | 5/2017 | Yu et al. | |
| 2017/0161323 A1 | 6/2017 | Simitsis et al. | |
| 2017/0161409 A1 | 6/2017 | Martin | |
| 2017/0164062 A1 | 6/2017 | Abramov et al. | |
| 2017/0339021 A1 | 11/2017 | Dukatz | |
| 2018/0079413 A1 | 3/2018 | Herrero et al. | |
| 2018/0145923 A1 | 5/2018 | Chen et al. | |
| 2018/0285759 A1 | 10/2018 | Wood et al. | |
| 2018/0365909 A1 | 12/2018 | Cheng et al. | |
| 2019/0019122 A1 | 1/2019 | Allen | |
| 2019/0026665 A1 | 1/2019 | Caskey et al. | |
| 2019/0043351 A1 | 2/2019 | Yang et al. | |
| 2019/0054925 A1 | 2/2019 | Froeschl et al. | |
| 2019/0095805 A1 | 3/2019 | Tristan et al. | |
| 2019/0140886 A1 | 5/2019 | Zywicki et al. | |
| 2019/0266141 A1* | 8/2019 | Coroiu | G06F 16/953 |
| 2019/0294927 A1* | 9/2019 | Guttmann | G10L 15/065 |
| 2019/0325354 A1 | 10/2019 | Rajnayak et al. | |
| 2020/0007827 A1 | 1/2020 | Saad et al. | |
| 2020/0072637 A1 | 3/2020 | Guidotti et al. | |
| 2020/0074156 A1 | 3/2020 | Janumpally et al. | |
| 2020/0081899 A1 | 3/2020 | Shapur et al. | |
| 2020/0145620 A1 | 5/2020 | Alcantara et al. | |
| 2020/0151360 A1 | 5/2020 | Zavesky et al. | |
| 2020/0172112 A1 | 6/2020 | Kawashima | |
| 2020/0211216 A1 | 7/2020 | Hagio et al. | |
| 2020/0226418 A1* | 7/2020 | Dorai-Raj | G06F 16/313 |
| 2020/0304854 A1 | 9/2020 | Baumgartner et al. | |
| 2020/0312046 A1 | 10/2020 | Righi et al. | |
| 2020/0351381 A1 | 11/2020 | Lacey et al. | |
| 2020/0380417 A1* | 12/2020 | Briancon | G06Q 10/06393 |
| 2020/0387833 A1 | 12/2020 | Kursun | |
| 2021/0076002 A1 | 3/2021 | Peters et al. | |
| 2021/0088867 A1* | 3/2021 | Nagel | G01N 21/8851 |
| 2021/0089374 A1 | 3/2021 | Watson et al. | |
| 2021/0104331 A1* | 4/2021 | Mysore | G16H 50/70 |
| 2021/0133808 A1 | 5/2021 | Chan et al. | |
| 2021/0136277 A1 | 5/2021 | McFarlane | |
| 2021/0216831 A1* | 7/2021 | Ben-Itzhak | G06F 18/2155 |
| 2021/0272702 A1 | 9/2021 | Hakami | |
| 2021/0297929 A1 | 9/2021 | Frusina et al. | |
| 2021/0377205 A1 | 12/2021 | Brown et al. | |
| 2021/0382893 A1* | 12/2021 | Kumar | G06F 16/2365 |
| 2021/0406720 A1* | 12/2021 | Song | H04L 63/0227 |
| 2022/0014907 A1 | 1/2022 | Boyd et al. | |
| 2022/0067181 A1* | 3/2022 | Carley | G06N 20/00 |
| 2022/0067655 A1* | 3/2022 | Benkreira | G06N 20/00 |
| 2022/0169258 A1 | 6/2022 | Samarthyam et al. | |
| 2022/0172604 A1 | 6/2022 | Guzik | |
| 2022/0291752 A1 | 9/2022 | Agu | |
| 2023/0206749 A1 | 6/2023 | Guzik | |

FOREIGN PATENT DOCUMENTS

| | | |
|---|---|---|
| KR | 20130010400 A | 1/2013 |
| KR | 20190086134 A | 7/2019 |
| WO | 2010056891 A1 | 5/2010 |

OTHER PUBLICATIONS

Mousavi et al. "A new ensemble learning methodology based on hybridization of classifier ensemble selection approaches" Dec. 2015 https://www.sciencedirect.com/science/article/pii/S1568494615005797 (Year: 2015).

U.S. Appl. No. 17/107,865, Office Action mailed Aug. 4, 2023, 91 pages.

U.S. Appl. No. 18/117,936, Notice of Allowance mailed Sep. 20, 2023, 21 pages.

U.S. Appl. No. 18/117,936, Office Action mailed Jul. 19, 2023, 30 pages.

U.S. Appl. No. 17/107,708, Final Office Action mailed Aug. 19, 2022, 52 pages.

U.S. Appl. No. 17/107,714. Office Action mailed Aug. 18, 2022, 66 pages.

U.S. Appl. No. 17/107,785, Notice of Allowance mailed Nov. 10, 2022, 26 pages.

U.S. Appl. No. 17/107,830, Notice of Allowance Nov. 9, 2022, 22 pages.

U.S. Appl. No. 17/107,877, Notice of Allowance mailed Aug. 22, 2022, 40 pages.

U.S. Appl. No. 17/590,738, Notice of Allowance mailed Oct. 5, 2022, 48 pages.

U.S. Appl. No. 17/107,764, Notice of Allowance mailed May 26, 2022, 26 pages.

(56) References Cited

OTHER PUBLICATIONS

U.S. Appl. No. 17/107,785, Office Action mailed Jul. 7, 2022, 21 pages.
U.S. Appl. No. 17/107,824, Notice of Allowance mailed Jun. 7, 2022, 33 pages.
U.S. Appl. No. 17/107,830, Office Action mailed Jun. 7, 2022, 51 pages.
U.S. Appl. No. 17/107,891, Office Action mailed Apr. 1, 2021, 22 pages.
International Patent Application No. PCT/US2021/060890, International Search Report and Written Opinion mailed Mar. 21, 2022, 11 pages.
International Patent Application No. PCT/US2021/060892, International Search Report and Written Opinion mailed Mar. 21, 2022, 10 pages.
International Patent Application No. PCT/US2021/060893, International Search Report and Written Opinion mailed Mar. 21, 2022, 9 pages.
International Patent Application No. PCT/US2021/060894, International Search Report and Written Opinion mailed Mar. 21, 2022, 9 pages.
International Patent Application No. PCT/US2021/060895, International Search Report and Written Opinion mailed Mar. 21, 9 pages.
International Patent Application No. PCT/US2021/060896, International Search Report and Written Opinion mailed Mar. 14, 2022, 11 pages.
Juan Rendon et al. Structural combination of neural network models. 2016 IEEE 16th International Conference on Data Mining Workshops (ICDMW). IEEE. Dec. 12, 2016, pp. 406-413. Section II; and figure 2.
Massimo Bonavita et al. Machine Learning for Model Error Inference and Correction. Journal of Advances in Modeling Earth Systems. Nov. 13, 2020, pp. 1-22. Section 2.1; and figure 1.
MD Manjurul Ahsan et al. Deep MLP-CNN Model Using Mixed-Data to Distinguish between COVID-19 and Non-COVID-19 Patients. Symmetry 2020. Sep. 16, 2020, pp. 1-14. Section 2; and figure 3.
U.S. Appl. No. 17/107,708, Office Action mailed May 9, 2022, 57 pages.
U.S. Appl. No. 17/107,764, Office Action mailed Dec. 8, 2021, 38 pages.
U.S. Appl. No. 17/107,785, Final Office Action mailed May 11, 2022, 9 pages.
U.S. Appl. No. 17/107,785, Office Action mailed Mar. 29, 2022, 30 pages.
U.S. Appl. No. 17/107,824, Notice of Allowance mailed May 2, 2022, 34 pages.
U.S. Appl. No. 17/107,824, Office Action mailed Dec. 29, 2021, 30 pages.
U.S. Appl. No. 17/107,877, Final Office Action mailed Dec. 29, 2021, 40 pages.
U.S. Appl. No. 17/107,891, Notice of Allowance mailed Nov. 2, 2021, 23 pages.
Van Hiep Phung et al. A High-Accuracy Model Average Ensemble of Convolutional Neural Networks for Classification of Cloud Image Patches on Small Datasets. Applied Sciences 2019. Oct. 23, 2019, pp. 1-16. Section 2; and figure 3.
Xueheng Qiu et al. Ensemble Deep Learning for Regression and Time Series Forecasting. 2014 IEEE Symposium on Computational Intelligence in Ensemble Learning (CIEL). IEEE, Dec. 9, 2014, pp. 1-6.
U.S. Appl. No. 18/117,698, Office Action mailed Oct. 3, 2023, 32 pages.
U.S. Appl. No. 17/107,877, Office Action mailed Aug. 18, 2021, 40 pages.
U.S. Appl. No. 17/107,891, Final Office Action mailed Aug. 5, 2021, 21 pages.
U.S. Appl. No. 17/107,708, Notice of Allowance mailed Mar. 29, 2023, 26 pages.
U.S. Appl. No. 17/107,708, Office Action mailed Dec. 8, 2022, 44 pages.
U.S. Appl. No. 17/107,714. Notice of Allowance mailed Dec. 15, 2022, 31 pages.
Wang et al., Supporting Very Large Models using Automatic Dataflow Graph Partitioning, 2019 (Year: 2019).

\* cited by examiner

CONTENT MANAGEMENT SYSTEM FOR TRAINED MACHINE LEARNING MODELS

BACKGROUND

Police officers and other first responders are under constant pressure to assess their situations before and during their involvement. They can be under constant threat from individuals, animals, environmental conditions, and the like. Additionally, once dispatched to a situation, personnel may have incomplete information on the circumstances and contextual information of their situations. As a result, they continually, to the extent practical, scan their surroundings and people in their immediate proximity to try to assess the threat to themselves and anyone around them.

BRIEF DESCRIPTION OF THE DRAWINGS

The detailed description is depicted with reference to the accompanying figures, in which the left most digit(s) of a reference number identifies the figure in which the reference number first appears. The use of the same reference numbers in different figures indicates similar or identical items.

DETAILED DESCRIPTION

This disclosure is directed to techniques for implementing a system that creates and provides trained machine language (ML) models, including individual trained ML created from multiple datasets that are comprised of underlying data. Techniques are also described that implement a content management system (CMS) that controls and manages the input of content such as video, audio, documents, and reports and outputs statistical confidence values that may inform situational awareness and decision-making.

In some embodiments, the system may implement real-world or simulated scenario in which action (or inaction) is detected, predicted, determined, and/or recommended based on incoming content, historical data, and historical predictions, determinations, recommendations, and results of subsequent action or inaction. One nonlimiting example is a law enforcement scenario in which action by a law officer may be dictated in accordance with information at hand made available to a CMS. In this example, indications, instructions, or recommendations may be provided to the law officer based on real-time and/or historical content, in accordance with predictions made by artificial intelligence. Such content may include, but is not limited to, environmental data, crime data, demographics, socioeconomic data, public and private records, and the like.

In some embodiments, content including real-time (live) data, or at least contemporaneous data, may be transmitted from a scene to a network operation center, sometimes referred to as a command center or NOC. The content may be audio or video taken by one or more officers, stand-alone cameras or microphones; reports, annotations, or other information manually provided by officers, etc. A CMS may be resident at the NOC or reside elsewhere but accessible to the NOC. The CMS may be implemented by one or more servers that receive content from the scene and, using artificial intelligence, process the content using machine learning (ML) techniques to obtain trained ML models based on the content (more specifically, ML models developed by training ML algorithms based on datasets comprised of underlying data derived from the content). Once trained, this ML model may be applied to subsequent datasets to predict and thus indicate (e.g., recommend) action, inaction, or decision-making with a statistical confidence that exceeds a predetermined threshold. Iterative machine learning, prediction, indication, and feedback in the way of performance results inform future model development to continually improve results. In this way, The CMS enhances situational awareness in an automated fashion, taking into account various present and historical factors including those described here.

In this disclosure, "action" should be understood to refer to both "action" and "inaction," as inaction may be an indication or recommendation of how to proceed based on factors as described herein. Similarly, "law officer," "police officer," "law enforcement officer," "security official," and the like may be used interchangeably or synecdochally. The person of ordinary skill in the art will understand from context when one or another of such terms implies various examples or parallels.

Figure 1:
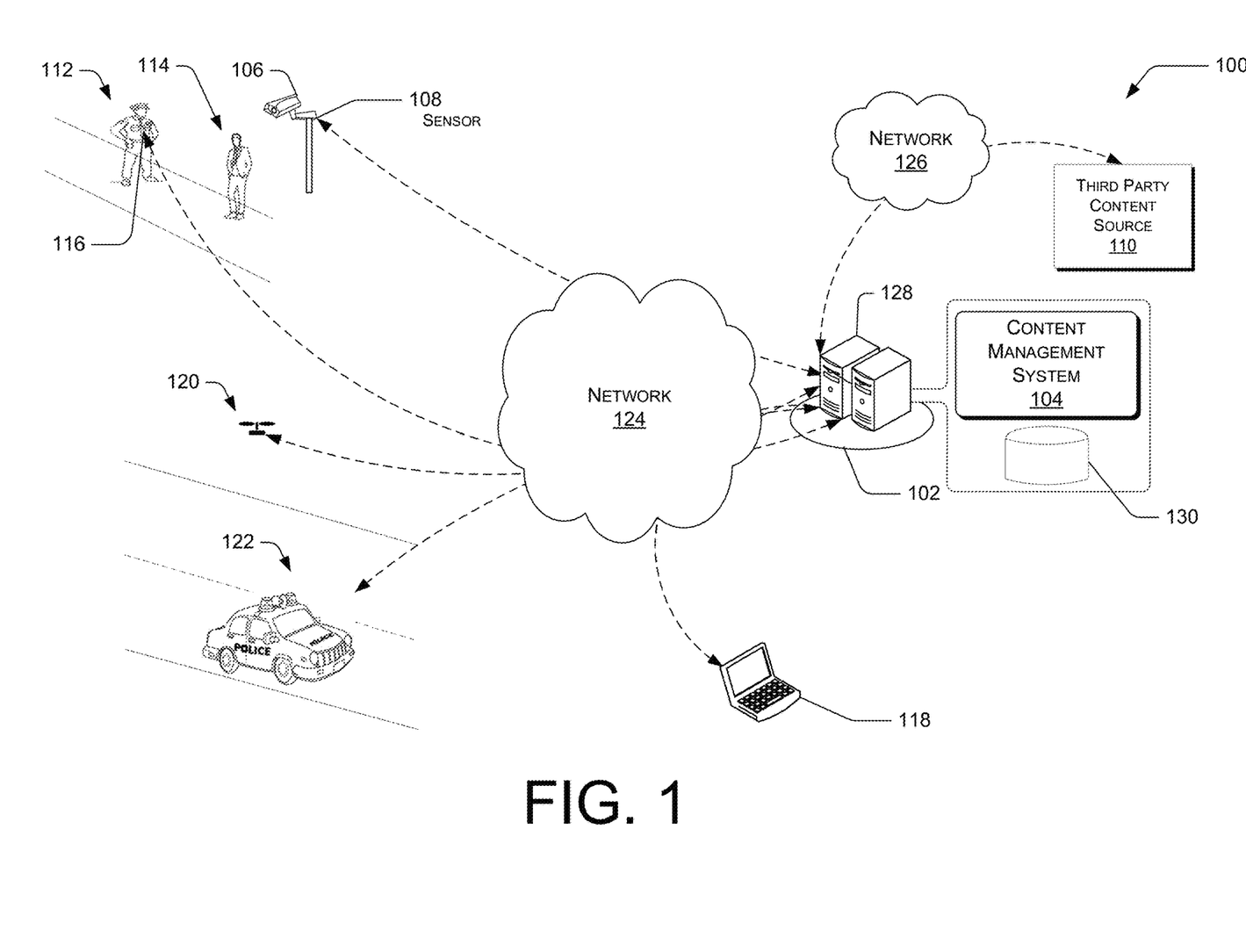
FIG. 1 is a schematic diagram of an illustrative collection and computing environment that includes a CMS configured to receive content and output some indication to respond to a situation of concern.

FIG. 1 is a schematic diagram of an illustrative collection and computing environment that includes a CMS configured to receive content and output some indication to respond to a situation of concern.

In FIG. 1, the example content collection and computing environment 100 includes a NOC 102, a CMS 104, a security camera 106, an environmental sensor 108, a third-party content source 110, a law officer 112, a subject 114, a body-worn camera (bodycam) 116, a field computing device 118, an aerial vehicle 120, and a police car 122. In the illustration, the NOC 102 communicates with one or more of the security camera 106, the environmental sensor 108, the law officer 112, the bodycam 116, the field computing device 118, the aerial vehicle 120, and/or the police car 122 over a network 124, and with the third-party content source 110 over a network 126. Either or both of the network 124 and the network 126 may be wireless (e.g., cellular networks). In some embodiments, part or all of the network 124 and/or the network 126 may be wired.

The NOC 102 may be considered a command center for monitoring and/or controlling operations concerning, and frequently carried out by, remote persons, devices, and/or systems. In the illustration, the NOC 102 monitors and/or controls operations involving the security camera 106, the sensor 108, the law officer 112, the bodycam 116, the field computing device 118, the aerial vehicle 120, and/or the police car 122. Among other functions, the NOC 102 may request and receive content from one or more source that the NOC 102 might not be actively monitoring or controlling, such as the third-party content source 110. Components of the NOC 102 may include one or more servers 128 and one or more data stores 130, together with any number of computing devices, display devices, workstations, etc. that might be typically found in a command center.

The CMS 104 manages content received from one to many sources such as those shown in FIG. 1 for purposes of illustration. The number and type of content sources are not limited to those shown, and indeed may number in the hundreds or more as dictated by the size and scope of the content collection and computing environment 100. In some embodiments, the CMS 104 is scalable and capable of managing a vast range of environments.

Content management may refer in general to the collection, managing, and publishing of information. Content may include data, information, or knowledge created through an iterative editorial process and intended for consumption, usually, but not necessarily over a private or public network. In this sense, from creation to review, improvement, further review, further improvement, etc., content is forward-looking, whereas static data, created for storage and retrieval without modification, is backward-looking (historical). Writings, pictures, products, email archives, presentations, audio, and video are all examples of content.

A content management system (CMS) is software (sometimes used loosely to also include hardware) to implement automated creation and/or propagation of new content, editing and/or propagating changes of existing content, performance of editorial processes on content, and configuring the content for presentation (publication) and consumption. A CMS may form part of a larger enterprise information management ecosystem and thus incorporate or communicate with a variety of management and management systems including, but not limited to, digital asset management (DAM), enterprise control management (ECM), media asset management (MAM), document management systems (DMS), and/or records management systems (RMS), to name several.

In general, content management is about creating, organizing, and/or controlling content, including organizing, searching, version tracking and accessing control in accordance with rules, policies, and access permissions. Content management has many aspects between creation (content origination) and publishing (content presentation). That is, content may be created by webpage designers, authors, musicians, etc., but also by anyone (or anything) wielding a camera, microphone, or computer, and even by sensor, machine, or artificial intelligence. Moreover, the medium or venue of publication depends on the "audience" and purpose of creating and publishing the content. Thus, content management is also about the operations that take the created content and prepare it for publication. By structuring content, a CMS can find and reveal various relationships between pieces of content and use that knowledge in many ways. In accordance with embodiments described herein, that may include one or more of manipulating content to meet a certain schema, massaging the content to improve its usability and informative value (such as removing corrupt data or data of poor quality), applying ML algorithms to data derived from the content, and creating ML models from the trained algorithms for better understanding of the data and for making future predictions and recommendations according to results of applying the models.

In some applications, content management is able to take into account various factors such as the source, subject, type, format, and amount of the content, the intended audience, channels for publication, timing relative to other content publication, etc. A CMS is further configured to track and manage multiple versions of instances of content. "Versioning" not only records iterations of "completed" content (i.e., ready for publishing) but permits rollback to past versions of the same content, which were previously published to the repository, so that crashes or undesirable presentations can be rolled back for troubleshooting, debugging, modifications, etc. In the context of ML modeling, versioning enables tracking of the data underlying the datasets. By versioning the datasets and models, the datasets may be improved by, e.g., adding or subtracting data of poor quality or from a malfunctioning or unreliable source. In addition, any data from the faulty source (for example, a camera with a scratched lens) can be easily scrubbed by reference to metadata. Datasets can also be cross-correlated with other datasets, or otherwise combined with other datasets, to improve the dataset and resulting models and prediction in accordance with better or more diverse data. To the extent that such efforts result not in better results but in poorer results, versioning permits rollback to previous datasets and models.

The security camera 106 represents one or more security imaging devices that constitute part of a security system. As such, the security camera 106 may be a single camera positioned to image a particular area, or multiple security cameras may be employed to cover a wider area and/or multiple discrete areas, and directed to capture the field of view that is directly in front of the camera. For example, the security camera 106 may be secured to a pole as shown, or installed on a ceiling, wall, floor, or any other location suited to its purpose. Moreover, still photos as well as video are contemplated. The security camera 106 may be capable of transmitting content to any of a variety of other recipients such as the field computing apparatus 118 or other devices, or even directly to the NOC 102 itself. Photos may be formatted in any suitable file type such as Joint Photographic Experts Group (JPEG), Portable Network Graphics (PNG), Tagged-Image File Format (TIFF), or Graphics Interchange Format (GIF). A video feed may be formatted as an Advanced Video Coding High Definition (AVCHD), Moving Picture Experts Group (MPEG), Movie Digital Video (MOV), Windows Media Video (WMV), or an Audio Video Interleave (AVI) file, by way of nonlimiting example. Content may be transmitted in real time to the NOC 102 or other recipient, or stored onboard for later uploading or transmission to, e.g., the field computing device 118 or NOC 102, for example. In some embodiments, the security camera 106 may include multiple still or video cameras that can capture field of view in multiple directions and create multiple feeds for transmission or storage. In FIG. 1, the security camera 106 is trained fortuitously on the law officer 112 and the subject 114.

The sensor 108 may represent any number, variety, and/or type of device for sensing one or more conditions relevant to the scenario. In FIG. 1, the sensor 108 is shown associated with the security camera 106. In that application, the sensor 108 may be a light sensor, a photocell configured to activate the security camera in particular lighting conditions, a temperature detector, a motion detector, etc. Myriad other locations for sensors are contemplated as would be suited to the sensory device and purpose. For example, one or more sensors 108 may be provided on the person of the law officer 112 (e.g., to monitor in real time the officer's health and physiological status such as heart beat rate, blood pressure, and other vital signs and statistics) as well as to the aerial vehicle 120 and/or the police car 122 as described elsewhere. In some embodiments, one or more sensors on or associated with the law officer 112 may detect the officer's position (e.g., location, posture, state of motion) or receive her voice or other noise from the surroundings. In some embodiments, one or more sensors 108 may be provided to the drone 120 or police car 122 to detect, for example, vehicle posture (e.g., stopped, moving and at what speed, orientation), a structural condition (e.g., motor, tires, blades), a condition of other onboard equipment (e.g., electronics, transmission quality), a condition of the interior (e.g., temperature, presence of water), and/or a condition of the immediate exterior (e.g., temperature, wind speed, precipitation).

The third-party content source 110 may represent one or more sources of content received or retrieved by the CMS from an entity beyond the immediate control of the CMS. For example, the third party source 110 may be a source of data that is relevant for the location, such as statistics with respect to population, neighborhood data, and/or crime data of the area of where the situation is taking place; background information on the subject 114; or on the position of additional law officers or other emergency services. Examples of third party sources 110 may include, without limitation, a records department of a municipal entity as a source of city or state vital records, a research organization as a source of demographics or socioeconomic data, or a school system as a source of student or personnel records, to name but a few.

The law officer 112 may represent one or more entities acting to collect content to be sent to the NOC. In some embodiments, the law officer 112 may be a police officer or security agent as depicted, but the concept may extend beyond that of law enforcement or even humans, for content may be obtained by social workers, medical professionals, robotic apparatus, and/or the like. Likewise, the subject 114 may represent one or more humans as depicted in a scenario in which the law officer 112 and the subject 114 may carry on a conversation. In some embodiments, the subject 114 may be a "person of interest" to law enforcement (e.g., a suspect or witness to a crime), a source of information related to the neighborhood or other individuals, or simply a passerby.

The bodycam 116 may represent one or more body-worn or -supported devices for collecting image, audio, or other content. For example, the bodycam 116 may be secured to the law officer 112 and directed to capture the field of view that is directly in front of the law officer 112. In some examples, the bodycam 116 may be secured to the vest, cap, or any suitable place on the law officer 112 to accomplish its purpose. The bodycam 116 may be capable of transmitting content, including photos, video, and/or audio, to any of a variety of other recipients such as the aerial vehicle 120, the field computing apparatus 122, or other devices, or even directly to the NOC 102 itself. Photos and video may be formatted in any suitable file type as described elsewhere herein and as suited to the device, location, and purpose. Content may be transmitted in real time to the NOC 102 or other recipient, or stored onboard for later uploading or transmission to, e.g., the field computing device 118 or NOC 102, for example. In some embodiments, the bodycam 116 may include multiple still or video cameras that can capture field of view in multiple directions, from the law officer 112, and create multiple feeds for transmission or storage.

The field computing device 118 may represent one or more portable or vehicle-mounted computing devices configured with hardware and/or software to which the security camera 106, the sensor 108, the law officer 112, the bodycam 116, the aerial vehicle 120, or another person or device may send content. The field computing device 118 enables the NOC 102 to communicate with the law officer 112 to provide her with a variety of information including, but not limited to, information about the location, scenario, available resources, scope of the visit to the location, and/or the like. The field computing device 118 also permits the law officer 112 to communicate corresponding information back to the NOC 102.

In some embodiments, the field computing device 118 may be or include a mobile communication device, a portable computer, a tablet computer, a smart phone, a slate computer, a desktop computer, or any other electronic device, and may be equipped with network communication components to receive and transmit data, data processing components to process data, and user interface components to receive data from, and present data to, a user or other device. Furthermore, the field computing device 122 may include some type of short-range communication ability that is independent of the network 124. The field communication device 118 may receive content by manual entry (e.g., typed by the law officer 112 or uploaded from a mountable device) or while enabled to passively receive or actively request content and/or commands from one or more content sources including but not limited to any of those just mentioned, as well as from the third party content source 110 and/or the NOC 102.

The aerial vehicle 120 may represent one or more manned or unmanned aerial vehicles. Examples of manned aerial vehicles include helicopters, balloons, and airplanes. Examples of unmanned aerial vehicles include human-controlled and autonomous fixed-wing drones or rotary-wing drones. In some embodiments, manned and unmanned vehicles may include equipment such as power supplies, computing devices (hardware and/or software), transmit and receive capability, in-flight response capability to onboard or remote control (such as from the NOC 102, law officer 112, and/or field computing device 122), etc. The aerial vehicle 120 may be provided with one or more cameras, listening devices, and/or sensors such as those described elsewhere herein and configured for use on the aerial vehicle 120.

The police car 122 may represent one or more vehicles that provide transportation for a law officer 112 or the like. The police car 122 is depicted as a typical squad car but may be a truck, van, motorcycle, bicycle, moped, or self-balancing personal transporter, to name a few. The police car 122 may include various electronics, including but not limited to hardware devices, software, mounting devices, sensors, transmit and receive components, etc. For example, in some embodiments the police car 122 may contain a docking station configured with a port for bodily and electrically receiving a portable field computing device 118, in which configuration the field communicating device 118 may be mounted and electronically connected to, e.g., transmit and receive components housed in the police car 122 for communicating with one or more of the NOC 102, the CMS 104, security camera 106, the sensor 108, the third party content source 110, the law officer 112, the bodycam 116, and/or the drone 120, as well as with other components, persons, or entities. Communications may include one or more of raw data, content, requests, responses, or commands. The police car 122 may also contain various sensors for sensing conditions within and outside the vehicle, and/or conditions of the vehicle and its components.

The networks 124 and 126 each may represent one or more wireless and/or wired communication networks, including but not limited to cellular networks, the Internet, and/or other public and private networks, including LANs, WANs, VPNs, and/or other networks internal to the NOC and/or third party content source.

The data store 130 may represent one or more storage components that may hold one or more of databases, raw data, raw content, datasets, ML or other data models, ML or other algorithms, etc. The data store 130 may store data that is used by the various modules of the CMS 104. The data store 130 may include one or more databases, such as relational databases, object databases, object-relational databases, and/or key-value databases. Information, including data (including datasets), content, data models, and algorithms may be stored and retrieved by requests and responses to and from the data store 130 via the CMS 104 and other components. Storage and retrieval are implemented via hardware and/or software components of both the sender and receiver of the responses and requests.

For the purposes of illustration, FIG. 1 illustrates one security camera 106, one sensor 108, one third party content source 110, one law officer 112, one bodycam 116, one field computing device 118, one aerial vehicle 120, and one police car 122. However, the NOC 102 can support or can be scaled to support multiple law officers or other personnel, and multiple instances of these and other devices and apparatus. In various embodiments, a wide range of instances of equipment or devices can be provided in support of individual officers or groups of officers, and for the environment or scenario in general. In some embodiments, the various devices, together with the NOC 102, may process simultaneously content received from multiple sources to assess multiple situations individually and/or simultaneously, in real time or in retrospect, to a goal of developing ever-improving datasets and ML models, and predictions, recommendations, decisions, and results obtained from the ML models. In some embodiments as well, content sources may be selected on site or at the NOC 102 for including their content in dataset creation. Criteria for selecting content sources may include, but is not limited to, expected relevance of the content (independent variable(s)) to the ML model output (dependent variable); expectation that the dependent variable for an ML model associated with first data is the same as the dependent variable of another model targeted for improvement; or the statistical confidence level in the model's prediction would be higher using different content or content from a different source.

Figure 2:
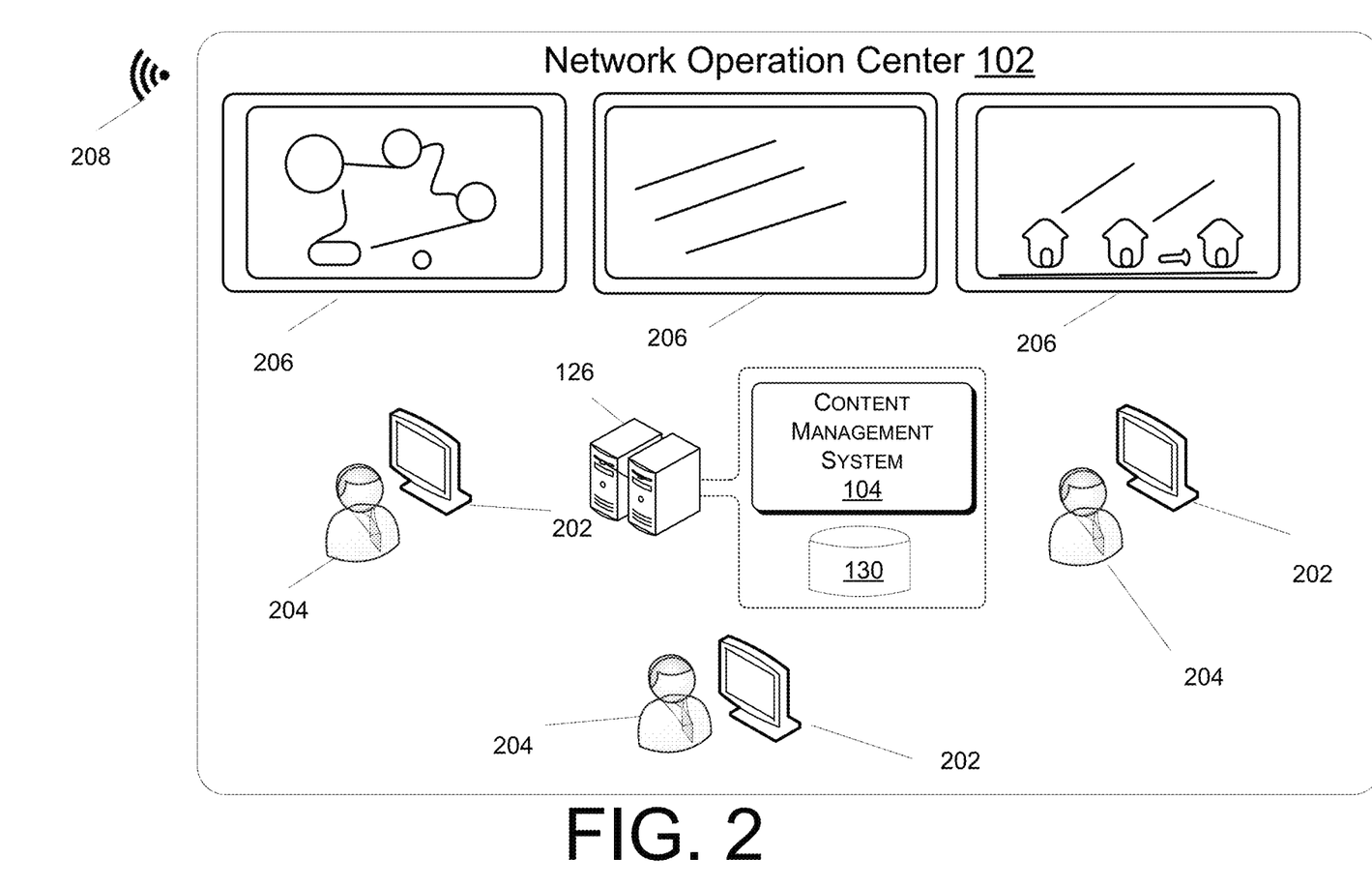
FIG. 2 is a block diagram showing various components of an illustrative Network Operation Center (NOC).

FIG. 2 is a block diagram showing various components of an illustrative Network Operation Center (NOC) 102. In the illustration, the NOC 102 incorporates the servers 126, computing devices 202 operated by users 204, information output devices (represented in FIG. 2 by monitor screens, or monitors, 206, although no limitation is intended), and wireless transmit and receive components 208.

The computing devices 202 may be general purpose computers, such as desktop computers, tablet computers, laptop computers, servers, or other electronic devices that are capable of receiving inputs, processing the inputs, and generating output data. In other embodiments, the computing devices 202 may be or include virtual components in the form of virtual machines or software containers that are hosted in a cloud.

The users 204 may represent dispatchers, data analysts, data entry personnel, decision makers, coordinators, and/or many other roles played in directing, coordinating, and generally supporting the content collection from the field and the on-site personnel. Conditioned on access privileges enforced by the servers 126, the users 204 may have access to a wide range of information. The users 204 may direct personnel in the field to particular locations or routes, meet with designated people, collect data or intelligence from a target neighborhood, or simply observe, interact with people, and make their presence known. The users 204 may also control various devices in the field, such as but not limited to one or more of the security camera 106, sensor 108, bodycam 116, field computing device 118, and/or aerial vehicle 120. In some embodiments, control of the devices may include sending commands to the devices to gather and transmit content and other information directly to the NOC. The users 204 may also in some instances be in direct contact with the law officer 112 via portable radio or by a vehicle-mounted device, which may include the field computing device 118, enabling a user 204 to know the scenario in which the law officer is located and add her personal input to the content and other information being received from the various devices mentioned. All of this information may be augmented by information received from the third-party source or sources 110.

The monitors 206 may be configured to display a variety of audio and visual information, including but not limited to video from the security camera 106 or the aerial vehicle 120, raw data from the sensor 108, and/or textual information from the field computing device 118, which have been received by the NOC 102 from these units, uploaded to one or more servers and/or directly to the workstations 202, and selectively displayed on the monitors 206 by the users 204. Frequently, some or all of such information may be received wirelessly as indicated at 208. In many instances, the content and other information being received by the NOC 102 is stored in the data store 130.

The wireless components 208 represent hardware and software that enable the wireless transmission and reception of commands, requests, responses, content, etc. to carry out the functions of the NOC 102.

Figure 3:
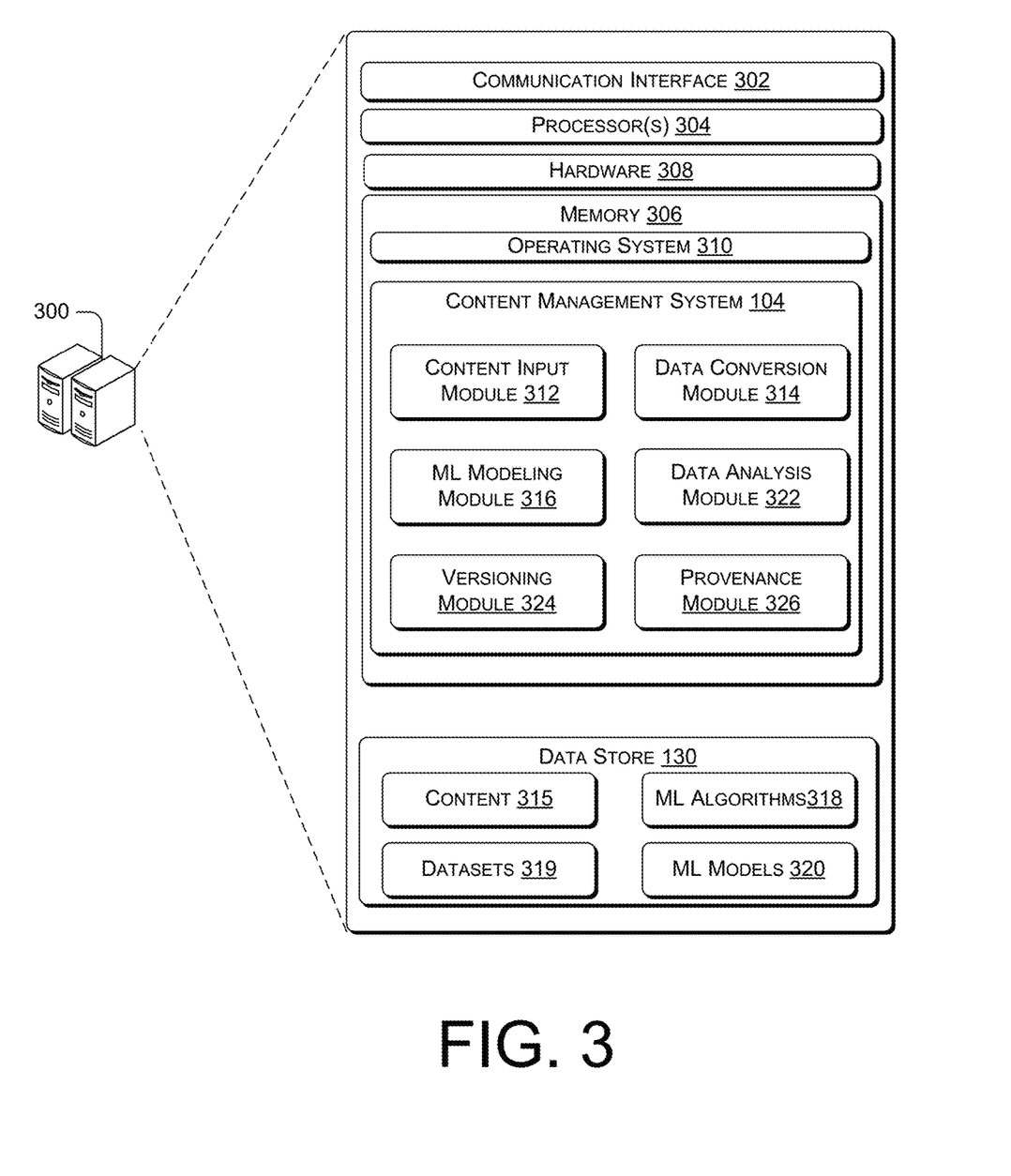
FIG. 3 illustrates an example of a computing device that may represent one or more of the servers of FIG. 1, equipped to carry out the described functions.

FIG. 3 illustrates an example of a computing device 300 that may represent one or more of the servers 126 of FIG. 1, equipped to carry out the described functions. The computing device 300 may be implemented as a single unit of hardware and/or software, or disaggregated across one or more sites, e.g., the cloud. The computing device 300 may be equipped with a communication interface 302, one or more processors 304, memory 306, device hardware 308, and the data store 130. The communication interface 302 may include wireless and/or wired communication components that enable the computing devices to transmit data to and receive data from other networked devices via a communication network. The device hardware 308 may include additional hardware that performs user interface, data display, data communication, data storage, and/or other server functions.

The memory 306 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, Random-Access Memory (RAM), Dynamic Random-Access Memory (DRAM), Read-Only Memory (ROM), Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. Computer readable storage media do not consist of, and are not formed exclusively by, modulated data signals, such as a carrier wave. In contrast, communication media may embody computer-readable instructions, data structures, program modules, or other data in a modulated data signal, such as a carrier wave, or other transmission mechanism.

The processors 304 and the memory 306 of the computing devices 300 may implement an operating system 310 and the content management system 104. The operating system 310 may include components that enable the computing device 300 to receive and transmit data via various interfaces (e.g., user controls, communication interface, and/or memory input/output devices), as well as process data using the processors 304 to generate output. The operating system 310 may include a display component that presents the output (e.g., display the data on an electronic display, store the data in memory, transmit the data to another electronic device, etc.). Additionally, the operating system 310 may include other components that perform various additional functions generally associated with an operating system.

The memory 306 may further include the CMS 104. The CMS 104 may include a content input module 312, a data conversion module 314, a machine learning (ML) modeling module 316, and a data analysis module 322. The CMS 104 may also interact with the data store 130, which may store content 315, ML algorithms 318, and ML models 320. The data store is shown as part of the computing device 300 but in practice may be external to the computing device 300, and indeed be largely external to the NOC 102 at an off-site location, and/or in disaggregated data centers, depending on the scale of the system and scope of the operation These modules may include routines, program instructions, objects, and/or data structures that perform particular tasks or implement particular abstract data types.

The content input module 312 may receive audio content, video content, sensor content, third-party content, and other content via the network 124 or the network 126. Video content, such as that received from the security camera 106, the bodycam 116, or the aerial vehicle 120, for example, may include visual and sound information of individual or individuals involved in the situation for analysis. Sensor content may include temperature, lighting conditions, presence of rain, one's vital signs, air contaminants, equipment dysfunction, etc. Third party content may include municipal records, crime data, demographics, civic activism, community service, etc.

The data conversion module 314 may be configured to receive data of content input to the content input module 312 and convert the data to a format that meets a schema suited to the content type, that can be ingested for machine learning. For example, in some embodiments, image content may be captured by a variety of imaging sources. Those imaging sources may be security cameras, bodycams, conventional cameras, smartphone cameras, handheld video cameras, and more. The cameras may be of different ages, different manufacturers, and output image data of different types or formats, at different resolutions or speed, with or without annotations. The same may be said for audio devices and textual devices. Ideally, the content may be formatted with a single respective schema common to each content type. Records received from a third-party source, whether structured or unstructured, may have irreconcilable differences (and thus require manual entry into an ingestible format). In some embodiments, some digital data may already be formatted with a common schema, in whole or in part, and thus be ready for ingestion by the content management system 104 at least as to the fields that meet the schema (non-conforming fields, or missing fields, may be dropped in some circumstances). Other content, such as the third-party content mentioned, may require manual conversion, in whole or in part.

The ML modeling module 316 may develop trained ML models to make a prediction about an identification, action, condition, or response based on iteratively training ML algorithms 318 from datasets 319, which may be created by the computing device 300 from underlying data representing or gleaned from historical content obtained from imaging devices, listening devices, textual input, and the like of which is also supplied by one or more of the security camera 106, sensor 108, third party content 110, bodycam 116, field computing device 118, and aerial vehicle 120. The ML modeling module 316 may include a variety of content processing systems (incorporating hardware and/or software executed by the processor(s) 304) for processing images (e.g., still photos, image frames or video from a video feed, etc.), audio (e.g., music, voice from the law officer 112 or subject 114, exclamations, etc.), textual content (e.g., reports, annotations to content, recording of time and location, etc. created by the law officer and sent via the field computing 118), content received from the third party content source 110 (e.g., personnel records, vital records, incident reports, etc.), and environmental information (e.g., maps, weather forecasts, terrain, etc.), and/or the like.

The ML algorithms 318 may be stored algorithms that may be trained from datasets created from formatted content data. Examples of ML algorithms include, but are not limited to, regression, decision tree, naïve Bayes, Bayesian networks, neural networks, cognitive networks, K-Means, etc. An ML algorithm may be selected with an eye toward combining datasets as described elsewhere herein, so it may be helpful to track which algorithms are used to create which models, and whether the algorithms were successful.

An ML algorithm 318 may be trained using an iterative process of running a known dataset (a "training dataset") through the model, determining how well the algorithm output fits a prediction based on the training dataset, and re-running the dataset until a statistical confidence based on the accuracy of the prediction can be made. For example, if the algorithm trained to the best fit is accurate within a predetermined range of accuracy with an acceptable frequency when applied to other data (the predictive accuracy of the algorithm is "close enough often enough"), then the statistical confidence may be computed from the statistics of the observed data (loosely speaking, the proportion of times that the observed data is in the acceptable range is the confidence level; said differently, if the confidence level is 90% then for a hypothetical dataset, in 90% of the samples the prediction will fall within the prediction range).

The datasets 319 may be sets of underlying data configured from the content 315 received at the content input module 312 and converted by the data conversion module 314. In some embodiments, the content and its corresponding data may be supplemented with data drawn from content of other locations, neighborhoods, and devices. For example, the content analysis module 220 may obtain data, extrapolate such data, and cluster the data based on location/neighborhood conditions and/or sensor and video data. As such, the data analysis module 220 may extrapolate and update safety quality values. In practice, as real-world measured safety quality values are collected, the data analysis module 220 may preferentially use real-world data over training data. Accordingly, the use of training data by the data analysis module 220 may be phased out or updated as historical data is collected. Subsequently, the data analysis module 220 may compare the signal quality value to a predetermined sentiment value. Additionally, the training data and real-world measured data may be used to establish a confidence interval and/or a confidence level for the safety rating value.

When prepared in this way, the data underlying the datasets 319 are formatted to a common schema as described elsewhere herein. Then, the dataset 319 may be suited not only for training individually a model algorithm 318, but for combining with another dataset 319 to train another algorithm 318 as described elsewhere herein.

The ML models 320 are stored models that have been trained to a statistical confidence that meets a predetermined threshold. In some embodiments, multiple models are developed by the ML modeling module 316 to cover a variety of expected input data (e.g., for real time use) or to cover a variety of available data (e.g., for more in-depth analysis and study). Models may be established for different scenarios so as to be called for a purpose. All of the ML models 320 may be continually tested against real results for maintaining a level of statistical confidence and for retraining or replacement with models using different input content as the case may be.

The data analysis module 322 may apply the ML models 320 to new content. The data analysis module 322, for example, may receive content from an incident in progress, retrieve one of the ML models 320, and apply the model to the incoming content. As the applied model is chosen for the situation at hand, it represents an important predictive asset to be deployed, for the model may be expected to provide a prediction as to a likely occurrence (for example, incoming content indicates that a crime may be about to be committed, or the law officer 112 may be in danger of assault), a command for subsequent action (e.g., backup law officers and/or medical personnel are called to the scene, deployed equipment (such as the aerial vehicle 120) is redeployed, or content capturing devices are activated, and/or a recommendation is sent to one or more recipients (e.g., a recommendation to leave all weapons in the vehicle and approach the subject 114 with hands visible, be alert for uncertain ground, keep the bodycam 116 activated, etc.). In some embodiments, one or more of the predictions, commands, and recommendations may be performed externally of the data analysis module 322, for example by the field communication device 118 or another computing device. Commands and/or recommendations particularly may be performed and/or carried out by a human based on output of the data analysis module 322 or based on an independent analysis of the output, which may be augmented by personal experience or other information not considered in the applied ML model. In some embodiments, the output of the data analysis module 322 may be converted into a score or rating, in essence quantifying the prediction result and forming the basis for any command or recommendation. For example, a score or rating, or alert based thereon, may be quickly taken in by the law officer 112 on site.

The versioning module 324 may be hardware and/or software that tracks and retains historical information of the ML models 320 such as creation time stamps and version numbers. Historical accuracy and statistical confidence values may also be stored for the various versions. As models are developed, deployed, tweaked, or re-deployed, some versions perform better than others. By versioning, inferior models may be dropped in favor of better-performing models, or perhaps applied to different datasets in a search for improvement.

The provenance module 326 may be hardware and/or software for tracking and retaining origin information about the datasets 319. The origin information may include time and date that the represented content was collected, together with such other metadata as location, equipment employed, personnel involved in the incident and/or collection of content, ML models trained on or applied to the datasets, etc. As described more fully elsewhere herein, multiple datasets may be combined to create new ML models that may prove to be better than any model previously developed from those datasets individually. With their provenance, yet more combinations of datasets may result in even better models and more useful predictions.

Figure 4:
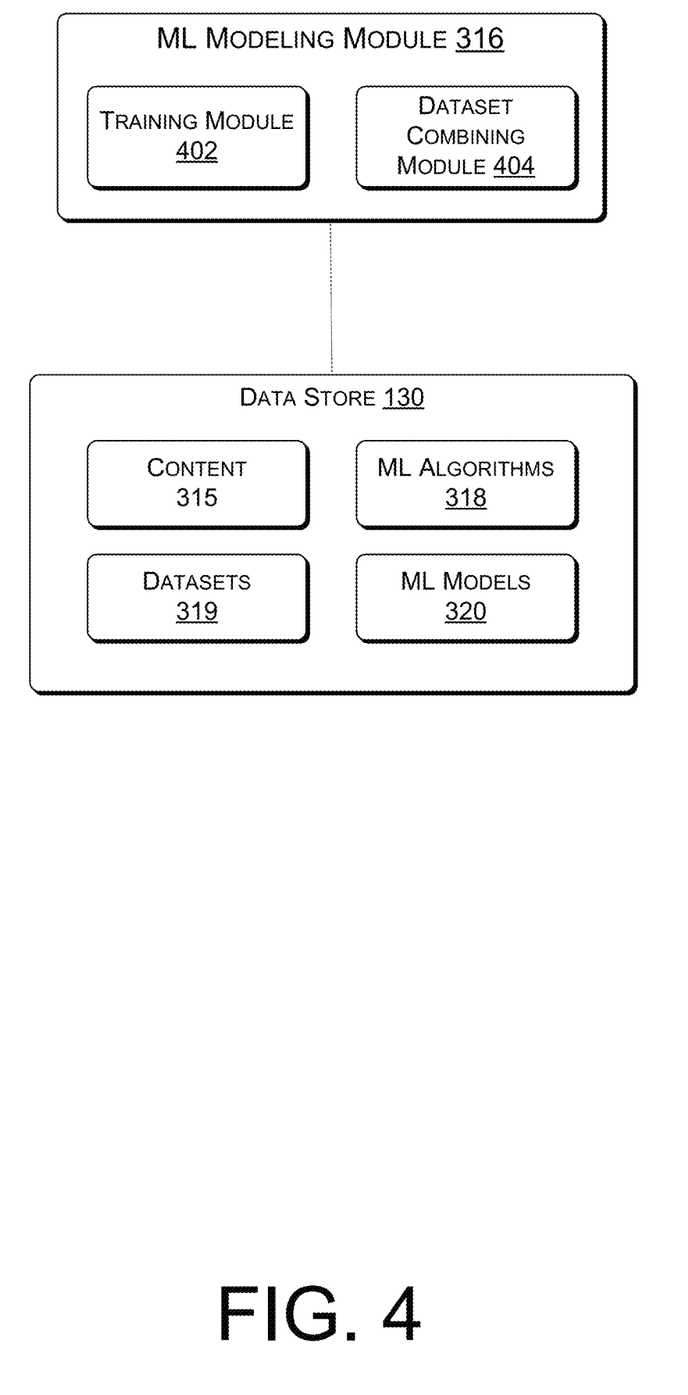
FIG. 4 is a block diagram that illustrates an operational relationship between the ML modeling module and datasets.

FIG. 4 is a block diagram that illustrates an operational relationship between the ML modeling module 316 and datasets 319, particularly in combining more than one dataset to train a model different from one that may have been developed from training other respective models. The ML modeling module 316 includes a training module 404 and a dataset combining module 404.

The training module 402 may be configured of hardware and/or software to input one of the datasets 319, apply one of the ML algorithms 318 retrieved, e.g., from the data store 130, and iteratively run the dataset through the ML algorithm until its output meets a predetermined statistical confidence. In some embodiments, a threshold value of the statistical confidence to satisfy is set for determining that the ML model is sufficiently trained to be used on new data, in particular in the context where the ML model is to predict a dependent statistical variable. For example, in a scenario where content is to be gathered and analyzed to determine whether a single law officer 112 may safely and effectively investigate a crime or gather evidence pointing to a future crime, 90% predictive accuracy may be required for an ML model prior to deployment in a production system in the field. Training the ML model may require multiple iterations on a training dataset until the ML model reaches its best fit. In testing the trained ML model against other data, the statistical confidence in the prediction must converge with the demonstrated accuracy to the threshold (here 90%), or the data model will be further trained, e.g., using a different training dataset or a different algorithm may be used.

The dataset combining module 404 may obtain two or more datasets and combine them to create a new model. In some embodiments, one or more of the datasets have been made from content obtained from different environments, and may include content in one dataset that ordinarily would not be used to develop a trained model or run through a trained model that was applied to another dataset. For example, combining two datasets may include choosing two datasets to have different independent variables as input to the trained ML model, but the same dependent variable. Combining the two datasets may create an improved model, informed by more context or content that might not have been considered insightful or even relevant, but which proves to correlate with different content in different ways than previously thought.

Thus, to use the example of FIG. 1, a model developed from a first dataset might be improved by adding a second dataset to the first dataset and developing a new and better model from the resulting third dataset, after sufficient training. By this technique, a dataset built from data of a similar scenario in a different location, or from another scenario entirely, may improve the model by incorporating content that could not have been obtained in compiling the first dataset.

Figure 5:
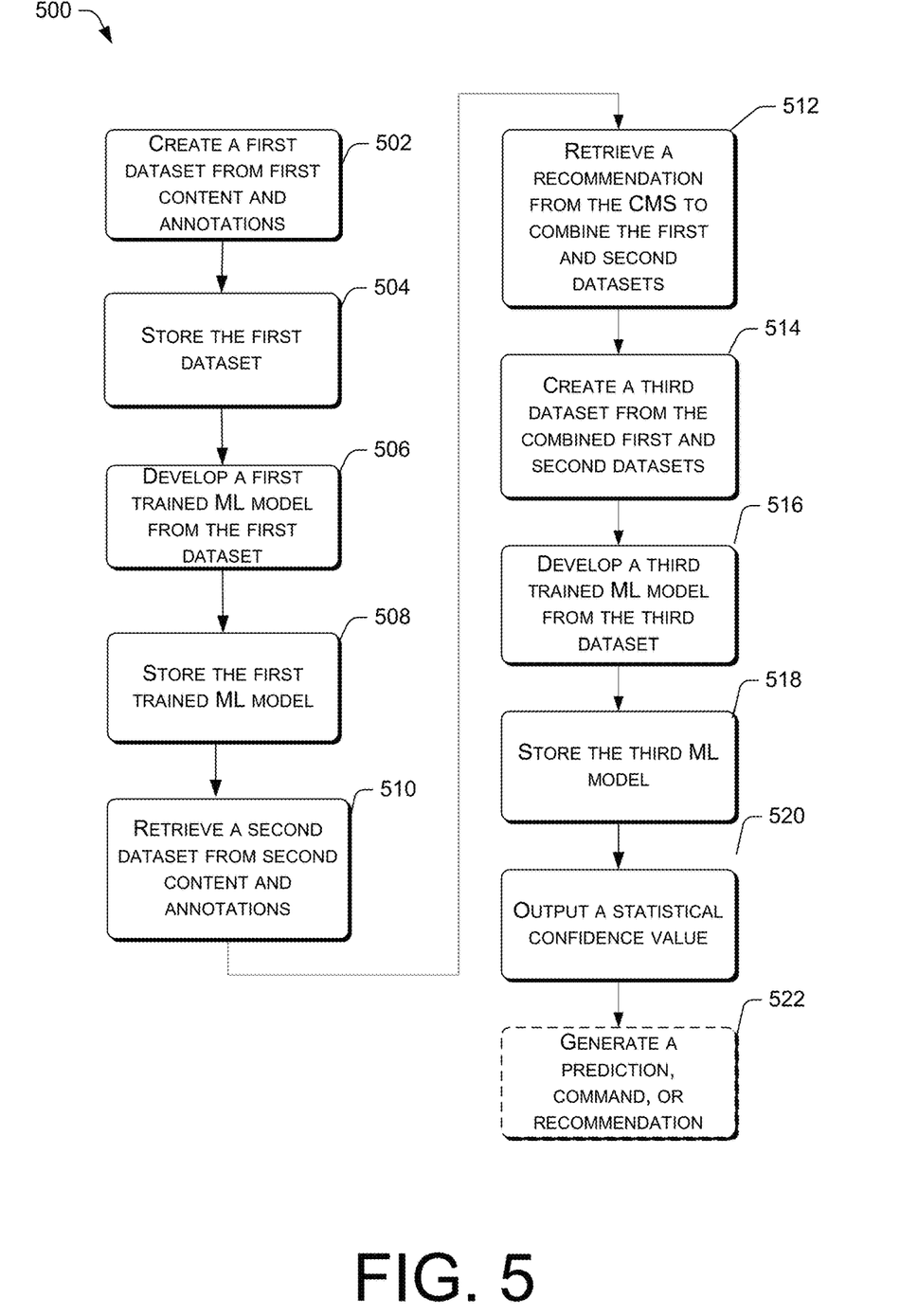
FIG. 5 is a flow diagram of an example process performed at least in part by the CMS for developing a trained ML model, applying the ML model to data of new content converted to a schema configured for the data type, outputting a statistical confidence in a prediction based on the model output, and optionally generating the prediction, a command, and/or a recommendation in accordance with the prediction.

FIG. 5 presents an illustrative process 500 for implementing the CMS 104. The process is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process 500 is described with reference to the collection and computing environment 100 of FIG. 1.

FIG. 5 is a flow diagram of an example process 500 performed at least in part by the CMS 104 for developing a trained ML model from a dataset, applying the trained ML model to data of new content converted to a schema configured for the data type, outputting a statistical confidence in a prediction based on the model output, and optionally generating the prediction, a command, and/or a recommendation in accordance with the prediction.

At block 502, the computing device 300 may create a first dataset from data and annotations representing or gleaned from historical content obtained from imaging devices, listening devices, textual input, and the like of which is also supplied by one or more of the security camera 106, sensor 108, third party content 110, bodycam 116, field computing device 118, and aerial vehicle 120. Annotations may be provided by the law officer 112 at the scene or at some other place, before, during, or after the events recorded. Annotations need not always be provided with the content. If they are, the content and annotations may form part of a single file or part of separate files and associated by metadata. In some embodiments, the content and/or annotations are transmitted to the NOC 102, wirelessly in some instances, or uploaded at the NOC 102 upon return.

At block 504, the data conversion module 314 may store the first dataset in data records for each item of content in the data store 130, accessible by the CMS 104. The data underlying the dataset may be data converted by the data conversion module 314 from content received by the content input module 310. The data records may be comprised of fields for the data underlying the datasets, or for the datasets themselves.

At block 506, the ML modeling module 316 may develop a first trained machine learning (ML) model trained from the first dataset. In some embodiments, the first trained ML model may be configured from one of the algorithms 318 to output a first value of a first dependent variable derived from data of the first dataset as a first independent variable, the output first value having a first statistical confidence greater than a first threshold.

At block 508, the ML modeling module 316 may store the first trained ML model in one or more data stores, such as the data store 130, which are accessible by the CMS 104. The data records may be comprised of fields for one or more of trained ML models, statistical confidences of outputs of the trained ML models, and statistical confidence thresholds, in which trained ML models are associated with respective datasets, datasets are associated with respective underlying data, the trained ML models are associated with respective statistical confidences and corresponding respective thresholds, and the trained ML models are associated with at least some metadata indicating respective one or more independent variables and respective one or more dependent variables.

At block 510, the CMS 104 may retrieve a second dataset comprised of second data and second annotations. In some embodiments, the second dataset may be retrieved from an external source (e.g., a different source that created the second dataset) or from the datasets 319 stored in the data store 130. The second dataset may correspond to a second trained ML model trained from the second dataset, and the second trained ML model may be configured to output a second value of the first dependent variable derived from data in the second dataset as a second independent variable different from the first independent variable. The output second value has a second statistical confidence greater than a second threshold. In some embodiments, the computing device 300 may create the second dataset and the ML modeling module 316 may develop the second trained ML model.

At block 512, the computing device 300 may retrieve a recommendation from the CMS 104 to combine the second dataset with the first dataset based at least on the first statistical confidence, the second statistical confidence, and an association between the first dependent variable and the second dependent variable of the first trained ML model. The association may be shown in the metadata of the underlying data of the first dataset and/or the metadata of the underlying data of the second dataset, or in one or more fields of the schema of one or both of the first and second datasets.

At block 514, the computing device 300 may create a third dataset from the combination of the first and second datasets. In some examples, the combination combines the first data, the second data, the first annotations, and the second annotations. The combination may result in the creation of new fields in the data records to accommodate fields of one dataset that are not present in the schema of the other dataset.

At block 516, the ML modeling module 316 may develop a third trained ML model trained from the third dataset. In some embodiments, the third trained ML model may be configured to output a third value of the first dependent variable derived from the first and second independent variables, the output third value having a third statistical confidence greater than a third threshold. Having been trained from the combined first and second datasets, this third trained ML model may be more effective as a predictor given a more varied context to the input content.

At block 518, the ML modeling module 316 may store the third dataset in the data records in the data store 130.

At block 520, the data analysis module 322 may output a statistical confidence in a prediction based on the model output.

At block 522, the data analysis module 322 may optionally generate the prediction, a command, and/or a recommendation in accordance with the prediction made by the data analysis module 322. The prediction may be a prediction of an upcoming response, action, or change in condition, for example, based on content reflected in the third dataset. The command may be a command sent to one or more recipients for subsequent action (e.g., backup law officers and/or medical personnel are called to the scene, deployed equipment (such as the aerial vehicle 120) is redeployed, or content capturing devices are activated). The recommendation may be sent to one or more recipients (e.g., a recommendation to the law officer 112 to leave all weapons in the police car 122 and approach the subject 114 with hands visible, be alert for uncertain ground, keep the bodycam 116 activated, etc.). In some embodiments, one or more of the predictions, commands, and recommendations may be performed externally of the data analysis module 322, for example, by the field communication device 118 or another computing device. Commands and/or recommendations particularly may be performed and/or carried out by a human based on output of the data analysis module 322 or based on an independent analysis of the output, which may be augmented by personal experience or other information not considered in the applied ML model. In some embodiments, the output of the data analysis module 322 may be converted into a score or rating, in essence quantifying the prediction result and forming the basis for any command or recommendation. For example, a score or rating, or alert based thereon, may be quickly taken in by the law officer 112 on site.

Certain aspects of content management for trained ML models have been described, largely with respect to a law enforcement scenario. However, aspects related to collecting content, converting formats of the corresponding data, developing trained ML models, and improving those models with the goal of improving the predictive quality of the models and in turn improving prediction, recommendations, and decision-making are all aspects that are relevant to scenarios that differ from law enforcement. Many examples may be cited. One example is an emergency response scenario such as a fire or deadly vehicle accident. Another may be a foray into an underexplored habitat. The use of artificial intelligence techniques as described herein may be applicable to numerous such scenarios in which a wide variety of content, real time or historical, on-site or off, may be collected and run on ML models of high statistical confidence, to the end of improving knowledge and response to challenging circumstances.

Although the subject matter has been described in language specific to the structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable storage media storing computer-executable instructions that, if executed by one or more processors, cause the one or more processors to perform acts comprising:
   creating a first dataset comprised of first data and first annotations;
   storing the first dataset in one or more data records in one or more data stores accessible by a content management system (CMS);
   training a first machine learning (ML) model using the first dataset, until an output of the first ML model meets a first statistical confidence greater than a first threshold, the trained first ML model configured to output a first value of a first dependent variable derived from data of the first dataset, wherein the data of the first dataset is used as a first independent variable;
   storing the trained first ML model in the one or more data records in the one or more data stores accessible by the CMS, wherein the one or more data records are comprised of fields for one or more of trained ML models, datasets, data underlying the datasets, statistical confidences of outputs of the trained ML models, and statistical confidence thresholds and the data records;
   associate the trained ML models with respective datasets that are associated with respective underlying data;
   associate the trained ML models with respective statistical confidences and corresponding respective thresholds; and
   associate the trained ML models with at least some metadata indicating respective one or more independent variables and respective one or more dependent variables;
   retrieving a second dataset comprised of second data and second annotations, training a second ML model using the second dataset, until an output of the second ML model meets a second statistical confidence greater than a second threshold, the trained second ML model configured to output a second value of the first dependent variable derived from data of the second dataset, wherein the data of the second dataset is used as a second independent variable different from the first independent variable;
   retrieving a recommendation from the CMS to combine the second dataset with the first dataset based at least on the first statistical confidence, the second statistical confidence, and an association between the first dependent variable and a second dependent variable of the trained first ML model;
   creating a third dataset from a combination of the first data, the second data, the first annotations, and the second annotations;
   training a third ML model using the third dataset, until an output of the third ML model meets a third statistical confidence greater than a third threshold, the trained third ML model configured to output a third value of the first dependent variable derived from the first and second independent variables;
   storing the third dataset in the one or more data records in the one or more data stores; and
   tracking one or more performance measures of the trained first ML model with respect to one or more criteria for selecting one or more content sources.

2. The one or more non-transitory computer-readable storage media of claim 1, wherein the acts further comprise:
   receiving the one or more criteria for selecting the one or more content sources for supplying content corresponding to the first data; and
   selecting the one or more content sources based on the one or more criteria.

3. The one or more non-transitory computer-readable storage media of claim 2, wherein the acts further comprise:
   in accordance with the selecting of the one or more content sources, receiving the content corresponding to the first data from the one or more content sources; and
   incorporating the one or more performance measures into determining data to be removed from the first dataset during training of the first ML model.

4. The one or more non-transitory computer-readable storage media of claim 1, wherein the acts further comprise:
   retraining the trained first ML model by multiple iterations on modifications of the first dataset to result in multiple retrained first ML models;
   versioning the retrained first ML models by performing a rollback to a previous version of the first dataset using the multiple retrained first ML models; and
   versioning statistical confidences for the retrained first ML models being versioned.

5. The one or more non-transitory computer-readable storage media of claim 4, wherein the acts further comprise:

tracking an effect of one or more content sources selection on the statistical confidences of the retrained first ML model; and tracking the retrained first ML models that have a statistical confidence greater than the first threshold.

6. The one or more non-transitory computer-readable storage media of claim 1, wherein the acts further comprise:

associating the third dataset with the first and second datasets in the one or more data records in the one or more data stores;

configuring the association of the third dataset with the first and second datasets to permit access to provenance of the first data and second data using the third dataset; and tracking the provenance of the first data and second data.

7. The one or more non-transitory computer-readable storage media of claim 1, wherein the acts further comprise:

determining metadata associations among data between the first dataset and the second dataset;

removing data having metadata unassociated with the second dataset from the first dataset, to result in an updated first dataset; and retraining the first ML model with the updated first dataset.

8. The one or more non-transitory computer-readable storage media of claim 1, wherein the acts further comprise:

creating the second dataset; and storing the second dataset in the one or more data records in the one or more data stores.

9. A server system, comprising:

one or more processors; and a memory, configured to store at least one executable instruction, and the executable instruction enables the one or more processors to perform operations comprising:

creating a first dataset comprised of first data and first annotations, and a second dataset comprised of second data and second annotations;

training a first machine learning (ML) model using the first dataset, until an output of the first ML model meets a first statistical confidence greater than a first threshold, the trained first ML model configured to output a first value of a first dependent variable derived from data of the first dataset, wherein the data of the first dataset is used as a first independent variable; training a second ML model using the second dataset, until an output of the second ML model meets a second statistical confidence greater than a second threshold, the trained second ML model configured to output a second value of the first dependent variable derived from data of the second dataset, wherein the data of the second dataset is used as a second independent variable different from the first independent variable;

retrieving a recommendation to combine the second dataset with the first dataset based at least on the first statistical confidence, the second statistical confidence, and an association between the first dependent variable and a second dependent variable of the trained first ML model;

creating a third dataset from the combination of the first and second datasets;

training a third ML model using the third dataset, until an output of the third ML model meets a third statistical confidence greater than a third threshold, the trained third ML model configured to output a third value of the first dependent variable derived from the first and second independent variables;

storing the first, second, and third datasets and the trained first, second, and third ML models in one or more data records, wherein the one or more data records are comprised of fields for one or more of trained ML models, datasets, data underlying the datasets, statistical confidences of outputs of the trained ML models, and statistical confidence thresholds and the data records:

associate the trained ML models with respective datasets that are associated with respective underlying data;

associate the trained ML models with respective statistical confidences and corresponding respective thresholds; and associate the trained ML models with at least some metadata indicating respective one or more independent variables and respective one or more dependent variables; and tracking one or more performance measures of the trained first ML model with respect to one or more criteria for selecting one or more content sources.

10. The server system of claim 9, wherein the operations further comprise:

incorporating the one or more performance measures into determining data to be removed from the first dataset during training of the first ML model.

11. The server system of claim 9, wherein the operations further comprise:

retraining the trained first ML model by multiple iterations on modifications of the first dataset to result in multiple retrained first ML models;

versioning the retrained first ML models by performing a rollback to a previous version of the first dataset using the multiple retrained first ML models; and versioning statistical confidences for the retrained first ML models being versioned.

12. The server system of claim 11, wherein the operations further comprise:

tracking an effect of one or more content sources selection on the statistical confidences of the retrained first ML model; and tracking the retrained first ML models that have a statistical confidence greater than a predetermined threshold.

13. The server system of claim 9, wherein the third dataset is associated with the first and second datasets in data records in one or more data store to permit access to provenance of the first data and second data using the third dataset; and wherein the operations further comprise:

tracking the provenance of the first data and second data.

14. The server system of claim 9, wherein the operations further comprise:

determining metadata associations among data between the first dataset and the second dataset;

removing data having metadata unassociated with the second dataset from the first dataset, to result in an updated first dataset; and retraining the first ML model with the updated first dataset.

15. A computer-implemented method, comprising:

creating a first dataset comprised of first data and first annotations;

storing the first dataset in one or more data records in one or more data stores accessible by a content management system (CMS);

training a first machine learning (ML) model using the first dataset, until an output of the first ML model meets a first statistical confidence greater than a first threshold, the trained first ML model configured to output a first value of a first dependent variable derived from data of the first dataset, wherein the data of the first dataset is used as a first independent variable;

storing the trained first ML model in the one or more data records in the one or more data stores accessible by the CMS, wherein the one or more data records are comprised of fields for one or more of trained ML models, datasets, data underlying the datasets, statistical confidences of outputs of the trained ML models, and statistical confidence thresholds and the data records:

associate the trained ML models with respective datasets that are associated with respective underlying data;

associate the trained ML models with respective statistical confidences and corresponding respective thresholds; and associate the trained ML models with at least some metadata indicating respective one or more independent variables and respective one or more dependent variables;

retrieving a second dataset comprised of second data and second annotations, training a second ML model using the second dataset, until an output of the second ML model meets a second statistical confidence greater than a second threshold, the trained second ML model configured to output a second value of the first dependent variable derived from data of the second dataset, wherein the data of the second dataset is used as a second independent variable different from the first independent variable;

retrieving a recommendation from the CMS to combine the second dataset with the first dataset based at least on the first statistical confidence, the second statistical confidence, and an association between the first dependent variable and a second dependent variable of the trained first ML model;

creating a third dataset from a combination of the first data, the second data, the first annotations, and the second annotations;

training a third ML model using the third dataset, until an output of the third ML model meets a third statistical confidence greater than a third threshold, the trained third ML model configured to output a third value of the first dependent variable derived from the first and second independent variables;

storing the third dataset in the one or more data records in the one or more data stores; and tracking one or more performance measures of the trained first ML model with respect to one or more criteria for selecting one or more content sources.

16. The computer-implemented method of claim 15, further comprising:

retraining the trained first ML model by multiple iterations on modifications of the first dataset to result in multiple retrained first ML models;

versioning the retrained first ML models by performing a rollback to a previous version of the first dataset using the multiple retrained first ML models; and versioning statistical confidences for the retrained first ML models being versioned.

17. The computer-implemented method of claim 16, further comprising:

tracking an effect of one or more content sources selection on the statistical confidences of the retrained first ML model; and tracking the retrained first ML models that have a statistical confidence greater than the first threshold.

18. The computer-implemented method of claim 15, further comprising:

associating the third dataset with the first and second datasets in the one or more data records in the one or more data stores;

configuring the association of the third dataset with the first and second datasets to permit access to provenance of the first data and second data using the third dataset; and tracking the provenance of the first data and second data.

19. The computer-implemented method of claim 15, further comprising:

creating the second dataset; and storing the second dataset in the one or more data records in the one or more data stores.

* * * * *